United States Patent [19]
Widmann

[11] 3,979,341
[45] Sept. 7, 1976

[54] UREA FORMALDEHYDE FOAM

[75] Inventor: Marcel Widmann, West Hill, Canada

[73] Assignee: Borden Products Limited, West Hill, Canada

[22] Filed: May 28, 1974

[21] Appl. No.: 473,759

[52] U.S. Cl............................ 260/2.5 F; 260/2.5 FP; 260/17.3; 260/29.4 R; 260/33.4 R; 260/45.7 R; 260/849; 260/851; 260/DIG. 24
[51] Int. Cl.$^2$...................... C08J 9/30; C08L 61/24
[58] Field of Search......... 260/2.5 P, 2.5 FP, 29.4 R

[56] References Cited
UNITED STATES PATENTS

| | | | |
|---|---|---|---|
| 2,076,295 | 4/1937 | Curs et al. | 260/2.5 F |
| 2,956,037 | 10/1960 | Venable | 260/2.5 F |
| 3,414,526 | 12/1968 | Mason | 260/2.5 F |
| 3,457,199 | 7/1969 | Wells et al. | 260/2.5 F |

*Primary Examiner*—Wilbert J. Briggs, Sr.
*Attorney, Agent, or Firm*—George P. Maskas; George A. Kap; Daniel D. Mast

[57] ABSTRACT

A foaming system includes a foaming agent solution and a resin solution. In a preferred embodiment, the foaming agent solution includes from 1.6 to 4.8 mmols of dibutyl naphthalene sulfonic acid as surfactant, from 5 to 20 mmols of phosphoric acid as catalyst and foam intumescent agent, from 0 to 45.5 mmols of resorcinol as foam anti-collapsing agent, from 9.1 to 54.6 mmols of chloral hydrate as fire retardant agent and sufficient water to make a solution of about 5% solids concentration. The resin solution includes urea formaldehyde resin produced by reacting from 1.0 to 2.4 mols of formaldehyde per mol of urea, from 6.5 to 500 mmols polyethylene glycol as foam charring component, from 0.3 to 1.2 mmols of calcium chloride as foam uniform cell size component, from 3 – 310 mmols of dicyandiamide as foam hydrolysis resistance component, from 2 – 30 mmols of sodium bromide as foam aging component, from 0 – 150 mmols of furfuryl alcohol as formaldehyde odor masking component and sufficient water to prepare a solution of 40 to 45% solids concentration. One part by weight of the foaming agent solution is frothed and then from 0.9 to 1.5 parts by weight of the resin solution is sprayed on the froth to obtain foam.

10 Claims, No Drawings

UREA FORMALDEHYDE FOAM

This invention relates to a flame-retardant urea-formaldehyde foam which has thermal and sound insulating properties as well as very low shrinkage.

Resinous foams are prepared from aqueous urea-formaldehyde solutions and then cured by an acidic hardening agent before elimination of residual water therefrom, as by drying. Either the resin solution or the hardener solution may first be converted into foam by incorporating a foaming agent therein followed by foam production, as by atomizing air or other inert gas into the solution. The foam is then blended with the resin component whereupon the acid in the hardener component acts to cure and harden the resinous foam without collapse of the foam. Residual water is removed by drying either at room or elevated temperature.

The urea-formaldehyde foam described herein is also a two-component system consisting of an aqueous solution of u/f resin and an aqueous solution of a foaming agent. A specially designed gun is used to produce the foam by foaming the foaming agent in a foaming chamber with the aid of pressurized air and then uniformly spraying the foamed agent with the aqueous solution of the u/f resin. Since this is an air froth system, there is no noticeable exothermic reaction and no post expansion of the foam after it is injected into a cavity. Because it is initially a liquid foam, it will entirely fill any shaped cavity. This eliminates costly precision cutting, gluing and fitting of insulation.

This foam has been used with excellent results as thermal insulation between precast concrete cladding or marble curtain wall and the supporting structures of multi-story complexes or any similar porous cavity constructions. The ease of application permits its use as a sound absorber in existing walls to effectively reduce sound transmission. It has also been used to provide both sound insulation and fire protection for laundry and garbage incinerator chutes.

The u/f foam described herein has many outstanding properties when compared to the prior art foams. For instance, its hydrolysis resistance is at least 20% better, its formaldehyde odor has been reduced by at least 25% and its cell size is uniform. Improved hydrolysis resistance has been achieved by incorporating resorcinol, dicyandiamide and low molecular weight polyethylene glycol, or their respective substitutes which can be used as total or partial replacements. Reduction in formaldehyde odor has been achieved through the use of furfuryl alcohol or furfural and resorcinol; and uniform cell size can be attributed to the presence of alkali metal ions, such as calcium, and to the manufacturing procedures. The other important properties of the foam are listed below.

Density:
 dry - 0.5 to 0.7 pcf
 wet - 2.0 pcf

Thermal Conductivity (K-factor):
 ASTM C-177  (25°F) - 0.22 BTU/hr°F ft²/in
             (70°F) - 0.23 BTU/hr°F ft²/in
 ASTM C-581  (25°F) - 0.22 BTU/hr°F ft²/in
             (70°F) - 0.23 BTU/hr°F ft²/in Thermal Resistance (R-factor):
 ASTM C-177  (25°F) - 4.5
             (70°F) - 4.4

Flammability:
 ASTM E-84  Flame Spread    - 20
            Smoke           - 20
            Fuel Contributed - 0

Total Shrinkage From Time of Application:
 Linear - 1.6% ave.

Sound Absorption:
 ASTM C-423 (No. 4 mounting, 2"thick foam)
 CPS   500 Hz   1,000 Hz   2,000 Hz   4,000 Hz
 %     66       90         81         83

Life Expectancy:
 Estimated Weight Loss over 32 years - 10%
 (Southern Ontario Climatic Conditions)

Throughout the temperature range of −50°F to +180°F, no significant dimensional changes occur. Acidity of freshly prepared foam is at pH of about 2 but that of cured foam is at pH of about 6. For this reason, corrosion on steel for the first 30 days after application is 6 mg/m²/day which diminishes to 0.00025 cm/yr after the 30-day drying period. Volume of water absorbed by this foam after immersion in water for 75 hours at 75°F is 10% maximum. The foam is resistant to most solvents but not to acids or alkalies. No protective masks are required by persons applying this foam. When this foam is exposed to flames, its surface forms a coherent layer of char which protects the underlying foam from further combustion. This property of the foam is described as intumescence.

The novel foam is prepared by atomizing air in a foaming agent and then spraying the u/f resin on the foamed foaming agent. The foaming agent is an aqueous solution of about 5% solids and the resin is also an aqueous solution of about 40% solids. The foam consists of approximately 48.3% by weight resin solution, 48.3% by weight foaming agent solution and 3.3% by weight of air.

The foaming agent solution includes the following ingredients, or suitable substitutes therefor, in amounts specified, based on the weight of the foaming agent solution or in terms of millimols, as noted. These ingredients are simply mixed together to form the foaming agent solution which has a solids concentration of 2% to 17%, preferably 6% to 9%.

| ingredients | Suggested Amount | preferred amount |
| --- | --- | --- |
| dibutyl naphthalene sulfonic acid | 0.5% to 1.5% 1.6–4.8 mmols | 1.1% |
| phosphoric acid | 0.5% to 2% (5–20 mmols) | 1.6% |
| resorcinol | 0 to 5% (0–45.5 mmols) | 1.5% |
| chloral hydrate | 1% to 6% (9.1–54.6 mmols) | 3.5% |
| water | remainder | remainder |

Although the prior art states that other long chain surfactants can be used in the foaming composition, it has been determined empirically that only long chain aryl and alkyl free sulfonic acids are suitable for my purpose. These free acids include alkyl, monoalkyl, and dialkyl aryl and monoalkyl and dialkyl naphthyl sulfonic acids containing from 9 to 20 carbon atoms per molecule. It is the free acids and not the salts or other derivatives thereof which have been found to impart desirable properties to the foam. The other surfactants that were tried had limitations of various sorts: some were incapable of producing a foamed foaming agent at temperatures below 15°C whereas others would produce foamed foaming agent but the foam would collapse when the resin solution was sprayed thereon.

As to the use of phosphoric acid, in order to impart the intumescent property to the foam, phosphoric acid must be used to the exclusion of any other acid except sulfuric acid. Resorcinol in flake form acts as a foam stabilizer. It prevents foam from collapsing prematurely, it absorbs free formaldehyde and thus reduces its odor by about 25%, it also increases foam resistance to hydrolysis by increasing cross-linking density. Polyvinyl alcohols as well as methylol melamines can be substituted for resorcinol since these materials are water soluble and provide adequate reactive sites for effecting cross-linking which results in hydrolysis resistant u/f polymers. It is the methylol melamines which are suitable for my purposes; not melamine. Melamine solubilizes in water with difficulty. When polyethylene glycol was used in place of resorcinol, it was found that the foam produced therewith was very susceptible to hydrolysis and showed higher water absorption. Furthermore, polyethylene glycol did not absorb formaldehyde nor did it provide sufficient cross-linking, as evidenced by the poor hydrolysis resistance of the foam prepared therewith.

Chloral hydrate is a fire-retardant. To achieve instantaneous fire retardancy in the foam, sodium bromide, or any other water-soluble alkali metal halide, is used. In absence of sodium bromide, the foam must be aged for a period of one week to several months before it achieves the required fire retardancy. Sodium bromide is preferably added to the resin solution and for this reason, it will again be referred to and described more fully later on. Sodium bromide, however, can also be added to the foaming agent solution.

Chloral hydrate is prepared by slowly adding an equal amount of water to chloral (trichloroacetaldehyde). Since the reaction is exothermal, cooling is provided to maintain temperature of the solution near but below 70°C. After 15 to 20% of the water is added, the exotherm diminishes and the rest of the water can be added faster. The final solution is cooled to room temperature and stored in lined drums or stainless steel tanks. Since this reaction produces a great deal of bad odors, it may be desirable to replace chloral hydrate with something else which is a suitable fire retardant but does not produce an offensive odor. The preferred replacement candidate is dibromobutene diol, which can be added either to the foaming agent solution or the resin solution. Other candidates include water-soluble halogenated compounds containing at least 3 carbon atoms per molecule. Amount of a substitute should be based on the equivalent weight of chlorine in chloral hydrate. Specific examples of suitable substitutes include 2, 3 dibromopropanol, and the various chloral derivatives which are obtained by reacting chloral with ammonia, alkanols, alkylene glycols, phenols, acetone or other compounds having an active hydrogen. Chloral is an eminent fire retardant in its own right but must be converted to the hydrate to render it water soluble.

Chloral hydrate must be added to the foaming agent solution and not to the resin solution. It was found that when it was added to the resin, the resin was unstable and gelled in a few days. Since dibromobutene diol, a suitable substitute for chloral, can be added either to the foaming agent solution or the resin, this provides an additional advantage to the advantage already noted; elimination of noxious fumes of sweetish and pungent nature when using chloral.

Shelf life of the foaming agent solution is about one year which could be extended if chloral hydrate were replaced with a suitable substitute which could be added to the resin solution instead, such as dibromobutene.

The u/f resin solution includes the following ingredients, or suitable substitutes therefor, in amount specified, indicated on a molar basis as well as on the weight of the resin solution, as otherwise indicated.

| Ingredient | Suggested Amount | Preferred Amount |
| --- | --- | --- |
| urea | 1.0 mole | 1.0 mole |
| formaldehyde | 1.0 to 2.4 moles | 1.5 moles |
| polyethylene glycol | 1 to 12% (6.5 – 500 mmols) | 3 to 6% |
| calcium chloride | 50 to 200 ppm (0.3 – 1.2 mmols) | 80 – 130 ppm |
| dicyandiamide | 0.1 to 10% (3 – 310 mmols) | 0.25 to 1% |
| sodium bromide | 0.1 to 1% (2 – 30 mmols) | 0.2% |
| furfuryl alcohol | 0 to 5% (0 – 150 mmols) | about 1% |
| water | remainder | remainder |

The resin solution has a solids concentration of 30 to 60%, preferably from 40 to 45%. With respect to the u/f ratio, the total u/f ratio has to be considered as present in the finished resin, including back-added urea.

The urea-formaldehyde resin suitable for my purpose is prepared by reacting from 1.8 to 2.4 moles of formaldehyde per mol of urea, preferably starting with a 50% solution of formaldehyde. Methylolation is carried out under mildly alkaline conditions at reflux for about 10 minutes at pH 7.4 to 7.7. Condensation is carried out at an acidic pH and when dilutability range of 100 to 450% is reached, indicating completion of the condensation reaction, pH of the resin is adjusted to neutral or slightly alkaline level. If dilutability of the finished resin is allowed to exceed 450%, very poor and wet foam is produced with high density. If dilutability is less than 100%, resin of very short shelf life is obtained and the foam produced therefrom has high shrinkage.

Sufficient urea is added to the condensed resin to bring the formaldehyde-urea ratio to 1.0 – 1.8. This is done for the purpose of absorbing free formaldehyde in the resin and has to be carried out while the resin is still above 80°C.

Polyethylene glycol, having molecular weight less than about 200, is added so that it is present during the condensation of urea and formaldehyde. It is added in an amount of 6.5 – 500 mmols, preferably from 20 – 250 mmols. If too much polyethylene glycol is used, hydrolysis resistence is reduced and the cost of foam is substantially increased since polyethylene glycol is one of the more costly components. If not enough of it is used, resulting foam is friable and will produce less char. Addition of polyethylene glycol to the resin reduces shrinkage somewhat, makes the resulting foam less fragile and more resilient and imparts the intumescent nature to the foam by promoting formation of a char layer when the foam is exposed to a flame. Molecular weight of polyethylene glycol should be in the range of 62 to 200. If polyethylene glycol having a molecular weight above about 200 is used, the resulting foam will not form a char although it will be nonflammable.

For the charring property of foam, one can use instead or as a partial replacement for polyethylene glycol, pentaerythritol, glycerine, sugars, other glycols or polyhydric alcohols, however, only polyethylene glycol imparts both the resiliency and the charring properties to the foam. The other suitable glycols include diethylene, triethylene, tetraethylene, propylene and dipropylene glycols. In general, suitable polyalkylene glycols have from 2 to 8 carbon atoms in the alkylene moiety and a molecular weight from 62 to 200.

In my system, polyethylene glycol, or its substitute, is condensed with the u/f resin. The prior art discloses the use of polyethylene glycols in u/f foams but it is not condensed with the resin but merely added as a separate component to the finished resin. This prior art practice results in foam which has less hydrolysis resistance and less uniform cell size than when polyethylene glycol is condensed with the resin.

Homogeneous foam of uniform cell size without large air pockets is obtained by incorporating into the foam a minute amount of an alkaline earth metal ion in the form of water-soluble salts. These salts can be added before or after condensation of urea and formaldehyde. Amount of the ions may vary from 0.3 to 1.2 mmol, preferably between 0.48 and 0.78 mmol. Suitable alkaline earth metal ions include calcium, magnesium, barium beryllium and strontium. The salt portion of the compound can be halide, carbonate, bicarbonate, sulfate, phosphate, nitrate, acetate, formate and alkylate in general, borate, chromate, dichromate, arsenate, cyanide, citrate, or any organic or inorganic acid radical providing a sufficiently soluble salt. The water used must be initially tested to determine its hardness before addition of an alkaline earth salt is made to make sure that the total amount of the ions present is in the specified range.

In a foam containing no alkaline earth ions, the foam particles containing resin are micelles since surfactant orients on the surface of the foam particles and make them behave like a liquid. Such foam is dense, has non-uniform cell size and flows very wet. If a minute amount of alkaline earth ion, such as the calcium ions, is added to the foam, the ions react with the surfactant and coat the resin particle to make it water insoluble. The result is that foam of good quality is formed having uniform cell size. If too many calcium ions are introduced, too much of the surfactant will be rendered water insoluble and foam will collapse since function of the surfactant is to provide and maintain structural integrity of the foam.

German Pat. No. 2,057,942 discloses a urea-formaldehyde foam with a u/f molar ratio of 1.8 to 2.2 per mole of urea which is mixed with a calcium or ammonium based sulfite liquors to make the resin more hydrolysis resistant. Calcium carbonate is also added in the amount of 1 to 5%, preferably 3%, on the basis of the resin solution, to prevent shrinkage of the foam. Since calcium carbonate is a base and is added in such a large amount, the hardner solution must contain excess acid to compensate for this. Also added is a blue dyestuff, phthalocyanin, in an amount of 0.01 to 0.1%, based on the resin solids, to improve flame retardance.

A number of foam compositions were prepared pursuant to the procedure set out herein with the exception that calcium carbonate was used in the amount of 3% based on resin solution which is within the range disclosed in the German Pat. No. 2,057,942. It was discovered that these foams were not stable but collapsed in a period of about 5 minutes to 12 hours and had high shrinkage. Calcium carbonate does not dissolve in the resin and has to be kept in suspension while foam is produced, otherwise it precipitates and plugs up the orifices.

Dicyandiamide is added to the resin to provide hydrolysis resistance to the foam. Amount thereof may be in the range of 3 – 310 mmols, preferably from 7 – 31 mmols. Dicyandiamide must be added to the finished resin since, if it is added during condensation of urea and formaldehyde, it would buffer the mixture to such an extent that it would take too long to reach the desired dilutability. As foam ages, dicyandiamide will hydrolyze slowly into alkaline fractions thereby neutralizing residual acid. It should be apparent that dicyandiamide, or any substitute therefor, must be water soluble and must hydrolyze at a slow rate to slowly and uniformly neutralize the residual acid, however, it cannot be too alkaline so as to interfere with the curing process of the foam. Suitable total or partial substitutes for dicyandiamide of medium to low alkalinity include guanylurea, calcium cyanamide, guanidine derivatives and hexamethylenetetramine. For comparison purpose, high alkalinity materials include sodium hydroxide, any alkaline and alkaline earth hydroxides and carbonates, tertiary amines, tertiary phosphates, etc.

Sodium bromide, or any other water-soluble alkali metal halogen, is added to the resin in an amount from 2 to 30 mmol, preferably 4 mmol, on a molar basis. It has been determined empirically that in absence of sodium bromide, the foam has to be aged to obtain and develop fire retardancy property. Such aging may take one week to several months. When sodium bromide is used, however, aging of the foam is dispensed with since such foam exhibits good fire retardant properties immediately after its preparation. It appears that there is some interaction between chloral hydrate and sodium bromide which permits chloral hydrate to impart its fire retardant property to the foam without any aging of the foam.

Furfuryl alcohol is an optional ingredient which may be added to the resin in amount ranging from 0 to 150 mmol, preferably about 30 mmol, on a molar basis. The function of furfuryl alcohol in the foam is to reduce formaldehyde odor and in this respect, it can be defined as an odor-masking agent. Other materials which can be used in total or partial replacement for furfuryl alcohol include furfural, triethylamine phenol, alkylphenols, essential oils.

The foam is produced by introducing foaming agent solution into a foaming chamber together with air under pressure of 30 to 90 psi, preferably 80 psi. The outlet of the foaming chamber is closed off by a fine mesh screen. Pressurized air and foaming agent are mixed in the foaming chamber to produce a froth. The froth is conveyed out of the foaming chamber and sprayed with the resin solution is of from about 1 part of the foaming agent solution to from 1.0 to 1.5 parts of the resin solution. On a dry basis, the weight ratio of foaming agent to resin is from 0.04 to 0.44.

Another application for the u/f foams is in the agricultural area, especially for frost protection where foam is used as an overlay on crops. In agricultural applications, the foam should be designed so as to deteriorate in a period ranging from 24 hours to 4 months. It is known that u/f resin can be made to deteriorate quickly by adding an excess amount of urea. This means that the resin should be prepared with as little as about one-half mole of formaldehyde per mole of urea with omission of dicyandiamide, but addition of excess acid and preferably accompanied by the use of a higher molecular weight of polyethylene glycol, such as in the range of 200 to 5,000.

The following examples illustrate preparation of the foaming agent solution, the resin solution and the foam by frothing the foaming agent solution and then spraying the resin solution thereon. These examples are illustrative only and should not be construed as limiting the invention which is properly delineated by the appended claims.

EXAMPLE 1 — PREPARATION OF CHLORAL HYDRATE

Chloral hydrate is prepared by loading 50 parts by weight of trichloroacetaldehyde (chloral) into a reactor provided with cooling coils. The cooling water is turned on and water is slowly added to the reactor at a rate to reach but not exceed 70°C. A great volume of offensive fumes are evolved during the reaction. A total of 50 parts by weight of water is added to the reactor. The exotherm diminishes after about 20% of the water is added at which time, remainder of the water is added faster. After addition of water is completed, contents of the reactor are cooled to room temperature and stored in a stainless steel tank.

EXAMPLE 2 — PREPARATION OF THE FOAMING AGENT SOLUTION

|  | Parts by Weight |
| --- | --- |
| resorcinol | 1.5 |
| water | 89.3 |
| chloral duohydrate (Ex.1) | 3.7 |
| BASF foaming agent 514 | 5.5 |

The BASF foaming agent 514 includes 1.1% of dibutyl naphthalene sufonic acid, 1.6% phosphoric acid and 2.5% water—all amounts being based on the weight of the foaming agent solution.

Resorcinol is dissolved in water and chloral hydrate is added to the solution. A check must be made at this point to make sure that all components have been dissolved. BASF foaming agent is added and the solution is agitated very carefully to avoid foaming. The foaming agent solution is loaded into a drum with fused polyethlene liner.

Gardner color of the foaming agent solution is 4 to 5, its pH is 1 to 1.5 and its shelf life is 1 year.

EXAMPLE 3 — PREPARATION OF THE U/F RESIN

|  |  | Weight |
| --- | --- | --- |
| 1. | formaldehyde, 50.0% solution | 34.569 |
| 2. | water | 16.374 |
| 3. | triethanolamine | 0.076 |
| 4. | aqua ammonia, 28% (26° BE) solution | 0.525 |
| 5. | urea prills | 16.706 |
| 6. | formic acid, 30% solution | 0.027 |
| 7. | polyethylene glycol 200 EX - Dow Chemical | 4.640 |
| 8. | formic acid, 30% solution | 0.066 |
| 9. | caustic soda, 50% solution | 0.046 |
| 10. | urea prills | 6.669 |
| 11. | water | 11.668 |
| 12. | furfuryl alcohol | 1.061 |
| 13. | water | 6.497 |
| 14. | dicyandiamide | 0.50 |
| 15. | sodium bromide | 0.070 |
| 16. | calcium chloride, anhydrous | 0.033 |
| 17. | water | 0.464 |
| 18. | caustic soda, 50% solution | 0.009 |

Formaldehyde (1) is loaded into a thoroughly cleaned reactor followed by water (2), triethanolamine (3). After the heat has been turned on and solution temperature reaches 60°C, aqua ammonia (4) and urea prills (5) are added. This will cause the temperature to drop off temporarily. The solution is heated to reflux and held at a mild reflux for 10 minutes following which the heat is turned off. Formic acid (6) and polyethylene glycol (7) are added and pH of the solution is adjusted to about 4.6 or 4.7 with formic acid (8). Adjustment of pH at this point must be made slowly because too much acid added at once will cause a violent exotherm, thus, condensation will proceed at an uncontrollable rate. The solution is again heated to maintain a mild reflux at about 95° to 98°C.

Dilutability of the resin is checked every 15 minutes until 1000% is reached and then it is checked more frequently until dilutability of 280 to 350% is reached. Dilutability is determined by placing 2 cc of the resin at 25°C into a graduated cylinder and water at 25°C is slowly added until clouding occurs. A hundred times the amount of water divided by 2 gives percent dilutability.

After the desired dilutability has been achieved, the resin solution is immediately neutralized with caustic soda (9) and pH is adjusted to 7.5–7.9 with additional caustic soda, if needed. Urea (10) is added and the resin solution is held for five minutes following which, water (11) and furfuryl alcohol (12) are also added and mixed for 5 minutes. After additional water (13) and dicyandiamide (14) are introduced into the solution, cooling of the solution is commenced at such a rate as to reach 25°C in 50 minutes.

If the solution is held for more than 5 minutes following the urea addition, or if it is cooled to 25°C slower than in 50 minutes, a resin is obtained which produces foam with a high shrinkage factor and the resin itself will have a short shelf life. If the solution is held for less than 5 minutes or if it is cooled to 25°C faster than in 50 minutes, the resin will not initially produce light foam but must be aged for a period of about several weeks to produce desirable foam. It appears that during this period, the resin is artificially aged to develop the desired properties.

Sodium bromide (15) is dissolved in the calcium chloride solution (16 and 17) and this solution is added to the batch. Stirring is continued for 30 minutes, pH of the finished resin solution is adjusted to the range of 7.4 to 7.7 with caustic soda (18) and the resin solution is discharged into a drum lined with a fused polyethylene liner.

The calcium content of the resin solution has to be adjusted to the desired value after determining hardness of water used for its preparation. Hardness determination of water is made by preparing a fresh solution of 60.0 grams of 0.01 molar disodium ethylenediamine tetraecetate solution, 10.0 grams of a buffer for water hardness solution (ammonium chloride-hydroxide buffer with magnesium ethylene diamine tetraacetate complex) and about 0.2 grams of the indicator which is a 1:1 mixture of eriochrom black T and sodium chloride. By means of a graduated 10 cc pipette, 7 cc of this solution is added to 20.0 grams of the resin solution and thoroughly mixed. If the mixture is of a blue color, more calcium chloride must be added. If the mixture is red, amount of the calcium level has been exceeded.

Solids content of the resin solution is 40 to 45%, specific gravity of 1.148 to 1.150, viscosity of 10 to 20 cps (1/60) and calcium ion content of 115 to 125 ppm.

After polyethylene glycol (7) has been added, condensation should be completed in about 60 minutes. If more time is required to complete condensation, resulting resin will produce foam which will exhibit high shrinkage. Storage temperature of the resin solution should be above 12°C.

EXPERIMENT 4 — PREPARATION OF FOAM

Foaming agent solution is introduced into a foaming chamber through a nozzle which is 1.2 mm in a diameter. The foaming chamber is 6.7 cm long by 13 mm ID and, together with the fine mesh screen of 100 mesh, disposed at the bottom of the foaming chamber which serves the purpose of mixing the foaming agent with pressurized air. Air with the other components is also introduced into the foaming chamber and forms a froth with the other components. The froth is conveyed out of the foaming chamber into a coupling and then into a mixing chamber in a hose. The coupling is 2 cm long by 7 mm ID and the hose is about 1.7 cm ID and about 6 feet long. The resin solution is sprayed onto the froth in the mixing chamber through a 1.2 mm spray nozzle to produce foam which is stable, flame retardant, has low shrinkage, long life expectancy and exceptional thermal and accoustical insulation properties. A special adapter is used to produce a resin solution spray in the form of a solid cone. As the foam is conveyed through the hose, additional mixing takes place to ensure a homogeneous foam composition with uniform air cells.

I claim:

1. An aqueous resin solution for making foam which is flame-retardant, intumescent and has thermal and sound insulating properties comprising a condensation product of urea and formaldehyde in the ratio of 1.0 to 2.4 mols of formaldehyde per mol of urea; from 6.5 to 500 mmols of a foam charring component selected from ethylene glycol and polyalkylene glycols having from 2 to 8 carbon atoms in the alkylene moiety and a molecular weight of up to 200, glycerine, pentaerythrytol, sugars, propylene glycol and mixtures thereof; from 0.3 to 1.2 mmols of a component to provide uniform cell size in the foam selected from alkaline earth metal ions in the form of water-soluble salts; from 3 to 310 mmols of a foam hydrolysis resistance component selected from dicyandiamide, guanylurea, calcium cyanamide, guanidine derivatives and hexamethylenetetramine; and from 2 to 30 mmols of a foam aging component selected from water-soluble alkali metal halogens.

2. The resin solution of claim 1 wherein amount of said charring component is from 20 to 250 mmols, that of uniform cell size component is from 0.48 to 0.78 mmols, and that of hydrolysis resistance component is from 7 to 31 mmols.

3. The resin solution of claim 2 wherein said charring component is selected from polyethylene glycols; said aging component is sodium bromide; said hydrolysis resistance component is dicyandiamide; and said uniform cell size component is calcium chloride; said solution also includes up to 150 mmols of formaldehyde odor masking component selected from furfuryl alcohol, furfural, phenols, essential oils, triethylamine and mixtures thereof.

4. The resin solution of claim 3 having solids concentration of 30 to 60% wherein the formaldehyde odor masking agent is selected from furfuryl alcohol, furfural and mixtures thereof.

5. A flame-retardant, intumescent foam which has thermal and sound insulating properties prepared from a mixture of (a) an aqueous urea-formaldehyde resin solution and (b) an aqueous foaming agent solution containing an acid curing agent, the resin solution comprising a condensation product of urea and formaldehyde in the ratio of 1.0 to 2.4 mols of formaldehyde per mol of urea; from 6.5 to 500 mmols of a foam charring agent selected from ethylene glycol and polyalkylene glycols containing from 2 to 8 carbon atoms in the alkylene moiety and having a molecular weight up to 200, glycerine, pentaerythrytol, sugars and mixtures thereof; from 0.3 to 1.2 mmols of a component to provide uniform cell size in the foam selected from water-soluble alkaline earth metal salts; from 3 to 310 mmols of a foam hydrolysis resistance component selected from dicyandiamide, guanylurea, calcium cyanamide, guanidine derivatives, hexamethylene tetramine; and from 2 to 30 mmols of a foam aging component selected from water-soluble alkali metal halogens.

6. Foam of claim 5 wherein amount of said charring component is from 20 to 250 mmols, that of uniform cell size component is from 0.48 to 0.78 mmols, and that of hydrolysis resistance component is from 7 to 31 mmols.

7. Foam of claim 6 wherein said charring component is selected from polyethylene glycols; said aging component is sodium bromide; said hydrolysis resistance component is dicyandiamide; and said uniform cell size component is calcium chloride; said solution also includes up to 150 mmols of formaldehyde odor masking component selected from furfuryl alcohol, furfural, phenols, essential oils, triethylamine and mixtures thereof.

8. Foam of claim 7 wherein said resin solution has solids concentration of 30 to 60% and wherein the formaldehyde odor masking agent is selected from furfuryl alcohol, furfural and mixtures thereof.

9. Foam of claim 5 wherein said foaming agent solution comprises from 1.6 to 4.8 mmols of a surfactant selected from alkyl and aryl free sulfonic acids having from 9 to 20 carbon atoms per molecule; from 5 to 20 mmols of an intumescent agent selected from phosphoric and sulfuric acids; and from 9.1 to 54.6 mmols of a fire retardant agent selected from chloral, chloral hydrate, dibromobutene diol, dibromopropanols, derivatives obtained by reacting chloral with ammonia, alkanols, alkylene glycols, acetone, phenols or other compounds having at least one active hydrogen, and mixtures of said fire retardants.

10. Foam of claim 9 wherein said surfactant is dibutyl naphthalene sulfonic acid, said fire retardant agent is chloral hydrate and said foaming agent solution has a solids concentration of 2 to 17%.

* * * * *